US011097708B2

(12) United States Patent
Leiber et al.

(10) Patent No.: US 11,097,708 B2
(45) Date of Patent: Aug. 24, 2021

(54) PRESSURE GENERATING DEVICE AND OPERATING METHOD COMPRISING AN ELECTRICALLY DRIVEN DUAL-ACTION RECIPROCATING PISTON

(71) Applicant: IPGATE AG, Pfäffikon (CH)

(72) Inventors: Heinz Leiber, Oberriexingen (DE);
Thomas Leiber, Munich (DE);
Christian Köglsperger, Geretsried (DE)

(73) Assignee: IPGATE AG, Pfäffikon (CH)

( * ) Notice: Subject to any disclaimer, the term of this patent is extended or adjusted under 35 U.S.C. 154(b) by 640 days.

(21) Appl. No.: 15/558,385

(22) PCT Filed: Mar. 16, 2016

(86) PCT No.: PCT/EP2016/055703
§ 371 (c)(1),
(2) Date: Jan. 23, 2018

(87) PCT Pub. No.: WO2016/146692
PCT Pub. Date: Sep. 22, 2016

(65) Prior Publication Data
US 2018/0194337 A1    Jul. 12, 2018

(30) Foreign Application Priority Data

Mar. 16, 2015 (DE) .................... 20 2015 107 072.1
Mar. 16, 2015 (DE) .................... 20 2015 107 075.6
(Continued)

(51) Int. Cl.
*B60T 13/68* (2006.01)
*B60T 8/40* (2006.01)
(Continued)

(52) U.S. Cl.
CPC .............. *B60T 13/686* (2013.01); *B60T 7/04* (2013.01); *B60T 8/17* (2013.01); *B60T 8/176* (2013.01);
(Continued)

(58) Field of Classification Search
CPC .... B60T 8/4081; B60T 13/745; B60T 13/686; B60T 8/4077; B60T 8/17
See application file for complete search history.

(56) References Cited

U.S. PATENT DOCUMENTS 6,007,161 A    12/1999 Worsdorfer
6,231,131 B1    5/2001 Dinkel et al.
(Continued)

FOREIGN PATENT DOCUMENTS

DE    19601268 A1    7/1997
DE    19601417 A1    7/1997
(Continued)

OTHER PUBLICATIONS

Int'l Search Report dated Feb. 27, 2017 in Int'l Application No. PCT/EP2015/081401.
(Continued)

*Primary Examiner* — Abiy Teka
(74) *Attorney, Agent, or Firm* — Panitch Schwarze Belisario & Nadel LLP

(57) ABSTRACT

A pressure generating device may comprise a piston-cylinder unit having a bilaterally acting piston with two effective surfaces defining two respective, separate working spaces in a sealing manner. Each working space is connected via a hydraulic line to a hydraulic circuit, wherein at least one hydraulic chamber of a consumer is connected to each hydraulic circuit, and wherein a drive drives the piston. Each working space may be in communication with a reservoir for hydraulic medium, via a respective hydraulic line having a
(Continued)

respective switching valve. Alternatively, one or both working spaces may be in communication with a reservoir for hydraulic medium via a hydraulic line, with a switching valve in one or both hydraulic lines, and/or a respective outlet valve may be associated with one or more hydraulic chambers of the consumer, and a further connecting line having a switching valve may connect the pressure chambers and/or hydraulic lines.

36 Claims, 9 Drawing Sheets

(30) Foreign Application Priority Data

| | | |
|---|---|---|
| Mar. 16, 2015 | (DE) | 20 2015 107 079.9 |
| Apr. 21, 2015 | (DE) | 20 2015 107 081.0 |
| Dec. 30, 2015 | (DE) | 20 2015 008 975.5 |
| Dec. 30, 2015 | (DE) | 20 2015 008 976.3 |

(51) Int. Cl.

| | |
|---|---|
| *B60T 13/74* | (2006.01) |
| *B60T 7/04* | (2006.01) |
| *B60T 8/17* | (2006.01) |
| *B60T 8/176* | (2006.01) |
| *B60T 13/58* | (2006.01) |
| *B60T 17/22* | (2006.01) |
| *B60T 8/32* | (2006.01) |
| *B60T 11/16* | (2006.01) |

(52) U.S. Cl.
CPC .......... *B60T 8/4022* (2013.01); *B60T 8/4077* (2013.01); *B60T 8/4081* (2013.01); *B60T 13/58* (2013.01); *B60T 13/745* (2013.01); *B60T 17/22* (2013.01); *B60T 8/326* (2013.01); *B60T 11/165* (2013.01); *B60T 2270/10* (2013.01); *B60T 2270/404* (2013.01); *B60T 2270/82* (2013.01)

(56) References Cited

U.S. PATENT DOCUMENTS

| | | | |
|---|---|---|---|
| 9,108,604 | B2 | 8/2015 | Bohm et al. |
| 9,205,821 | B2 | 12/2015 | Biller et al. |
| 9,399,452 | B2 | 7/2016 | Roll et al. |
| 9,566,960 | B2 | 2/2017 | Feigel |
| 9,876,416 | B2 | 1/2018 | Eckert et al. |
| 10,112,592 | B2 | 10/2018 | Leiber et al. |
| 10,421,447 | B2 * | 9/2019 | Leiber ................ B60T 8/4081 |
| 2001/0020210 | A1 | 9/2001 | Hessmert et al. |
| 2008/0179944 | A1 | 7/2008 | Spaeth |
| 2009/0072615 | A1 | 3/2009 | Oosawa et al. |
| 2009/0115247 | A1 | 5/2009 | Leiber et al. |
| 2012/0030626 | A1 | 2/2012 | Hopkins et al. |
| 2012/0061192 | A1 | 3/2012 | Birkheim |
| 2012/0306261 | A1 | 12/2012 | Leiber et al. |
| 2013/0127237 | A1 | 5/2013 | Pfeiffer et al. |
| 2013/0207452 | A1 | 8/2013 | Gilles et al. |
| 2014/0333124 | A1 | 11/2014 | Koo |
| 2015/0021978 | A1 | 1/2015 | Feigel |
| 2015/0028667 | A1 | 1/2015 | Leiber et al. |
| 2015/0061854 | A1 | 3/2015 | Drumm et al. |
| 2015/0069828 | A1 | 3/2015 | Ueno et al. |
| 2015/0088396 | A1 | 3/2015 | Schmitt |
| 2015/0197229 | A1 | 7/2015 | Knechtges et al. |
| 2015/0375726 | A1 | 12/2015 | Roll et al. |
| 2016/0207514 | A1 | 7/2016 | Knechtges et al. |
| 2016/0221554 | A1 | 8/2016 | Knechtges et al. |
| 2018/0126971 | A1 | 5/2018 | Leiber et al. |
| 2019/0031165 | A1 | 1/2019 | Besier et al. |

FOREIGN PATENT DOCUMENTS

| | | |
|---|---|---|
| DE | 102005055751 A1 | 11/2006 |
| DE | 102009043484 A1 | 3/2011 |
| DE | 102011077329 A1 | 1/2012 |
| DE | 102011118365 A1 | 5/2013 |
| DE | 102012002791 A1 | 8/2013 |
| DE | 102013203594 A1 | 9/2013 |
| DE | 102013222061 A1 | 9/2014 |
| DE | 102013224313 A1 | 9/2014 |
| WO | 2003038246 A2 | 5/2003 |

OTHER PUBLICATIONS

Int'l Search Report dated Feb. 14, 2017 in Int'l Application No. PCT/EP2015/081402.
Written Opinion dated Feb. 27, 2017 in Int'l Application No. PCT/EP2015/081401.
Written Opinion dated Feb. 14, 2017 in Int'l Application No. PCT/EP2015/081402.
Int'l Search Report dated Aug. 1, 2016 in Int'l Application No. PCT/EP2015/081403.
Written Opinion dated Aug. 1, 2016 in Int'l Application No. PCT/EP2015/081403.
Int'l Preliminary Report of Patentability dated Sep. 19, 2017 in Int'l Application No. PCT/EP2015/081402.
Int'l Preliminary Report on Patentability dated Sep. 19, 2017 in Int'l Application No. PCT/EP2016/055703.
Int'l Search Report dated Jul. 28, 2016 in Int'l Application No. PCT/EP2016/055703.
Int'l Preliminary Report on Patentability dated Sep. 19, 2017 in Int'l Application No. PCT/EP2015/081403.
Int'l Prelimininary Report on Patentability dated Sep. 19, 2017 in Int'l Applicatin No. PCT/EP2015/081401.

* cited by examiner

PRESSURE GENERATING DEVICE AND OPERATING METHOD COMPRISING AN ELECTRICALLY DRIVEN DUAL-ACTION RECIPROCATING PISTON

CROSS-REFERENCE TO RELATED APPLICATION

This application is a Section 371 of International Application No. PCT/EP2016/05703, filed Mar. 16, 2016, which was published in the German language on Sep. 22, 2016 under International Publication No. WO 2016/146224 A1, which claims priority under 35 U.S.C. § 119(b) to German Patent Application No. 20 2015 107 079.9, filed Mar. 16, 2015, German Patent Application No. 20 2015 107 075.6, filed Mar. 16, 2015, German Patent Application No. 20 2015 107 072.1, filed Mar. 16, 2015, German Patent Application No. 20 2015 107 081.0, filed Apr. 21, 2015, German Patent Application No. 20 2015 008 975.5, filed Dec. 30, 2015, and German Patent Application No. 20 2015 008 976.3, filed Dec. 30, 2015, the disclosures of which are incorporated herein by reference in their entireties.

FIELD OF ENDEAVOR

This application generally relates to pressure generating devices.

PRIOR ART

From DE 10 2014 224 201 A1 coupling actuators are known, which are connected to one another via a hydraulic line for the actuation of a friction coupling via a master cylinder and slave cylinder, wherein the master cylinder is actuated via an electric motor and a gear mechanism. Such actuating approaches are appropriate in the case of simple coupling actuations, e.g. E couplings, but with double couplings a system for the individual actuation is required for each actuating system. The costs of double coupling systems are as a result approximately twice as high as for E couplings. In addition to this there are costs for the actuation of further hydraulic consumers.

In DE 10 2006 038 446 A1 a double coupling actuating system with solenoid valves is described, in which couplings as well as change speed selectors are actuated via one or two electric motor piston drives. Since a change speed selector cannot be actuated simultaneously with the coupling, this approach is more appropriate as regards cost reduction than the use of coupling actuators and hydraulic or electromechanical change speed selectors. The actuation of two couplings with one actuator is however very complicated to implement, since two couplings have to be simultaneously actuated in the switching operation. This is very difficult to realise with an actuator using a corresponding valve switching.

In WO 2015/036623 A2 an electrically driven pressure regulating and volume conveying unit with double-stroke pistons is described, with which pressure can be built up and reduced via the piston path control, wherein a switch valve is provided with which the two working chambers of the double-stroke piston can be connected to one another with the aim of reducing the hydraulically active surface and thus reducing the torque of the drive motor.

Object of the Invention

The object of the invention is to provide an electrically driven adjustment actuator, with which multiple hydraulic consumers, in particular slave cylinders, for example in the form of couplings, change speed selectors, hydraulically actuated cylinders with one or two hydraulic pressure chambers, pistons for electrohydraulic valve operation or steering means, can be operated with few switching valves and at the same time a precise pressure regulation can be achieved.

Achieving the Object

The object of the invention is achieved with a pressure generating device having various features as may be recited in one or more of the accompanying claims.

A hydraulic piston actuator based on the double-stroke piston principle with two hydraulic chambers and electrically driven via a linear actuator or a motor-gear unit is provided with the pressure generating device according to the invention, which can build up and reduce pressure as necessary very precisely and jointly in multiple consumers and at the same time by utilising the stored energy of the volume can reduce the pressure in one consumer and build it up in another consumer. Also, the volume of a chamber of a double-chamber consumer (e.g. steering mechanism, change speed selector) can be displaced in a regulated manner via the pressure generating device into the second chamber of the double-chamber consumer. The pressure regulation is carried out in this connection via a pressure-volume control through the piston and/or via pressure regulation using pressure sensors.

Thus, by means of the pressure generating device pressure can be built up in one hydraulic slave cylinder, for example a coupling actuator, while pressure is simultaneously reduced in the other coupling actuator, wherein the stored pressure is utilised at least in part to lessen the performance requirement for the actuator drive, in particular with dynamic adjustment procedures. Thus, the adjustment position for example of a rod of a steering mechanism or a change speed selector can also be adjusted very precisely via the pressure regulation by means of the double-stroke piston, approximately comparable to that of an electromechanical actuation. This can be achieved in both stroke directions (forward stroke and reverse stroke of the double-stroke piston). This pressure build-up is suitable in particular for controlling a double coupling gear mechanism, in which simultaneously one coupling is released while the other is actuated (FIG. 4) or a piston is bilaterally adjusted (FIG. 6).

One possible embodiment of the invention is characterised in that each working chamber of the piston-cylinder unit of the pressure generating unit is connected by means of a hydraulic line to a reservoir vessel for a hydraulic medium, wherein in each hydraulic line of at least one working chamber of the double-stroke piston there is arranged at least one switching valve for the optional closure or opening of the hydraulic line. By means of this arrangement according to the invention the pressure in each hydraulic circuit can be reduced into the reservoir vessel via the working chamber connected in each case to the hydraulic circuit and the open switching valve. In this connection the pressure in the respective hydraulic circuit can be reduced based on the pressure measurement in the respective hydraulic circuit. By additional use of the stroke control of the piston of the double-stroke piston based on the pressure-volume characteristic curve(s) it is also possible that by opening a switching valve for a predetermined or calculated duration, the pressure in the respective hydraulic circuit and in the consumer or consumers connected thereto is altered. Since an additional switching valve is associated with each consumer, by means of which the consumer can be disconnected from its hydraulic circuit, the pressure can also be reduced or built up in fewer than all the consumers of a hydraulic circuit. In this embodiment it is further more possible that by the adjustment of the piston, the working space is enlarged so that the pressure in the respectively connected hydraulic circuit is reduced as described hereinbefore. This is referred to as a volume control. In order to reduce the pressure even more quickly in the hydraulic circuit and the connected consumer(s), it is obviously also possible that with the switching valve open in the hydraulic line to the reservoir vessel, the working space is at the same time enlarged by the adjustment of the piston. In this way the dynamics of the pressure generating unit are significantly increased.

In another embodiment the pressure chambers and/or the hydraulic lines that lead from the working chambers to the consumers are connected to one another via a connecting line, wherein in the connecting line a switching valve is arranged for the optional opening or closing of the connecting line. In this embodiment only one working chamber of the piston-cylinder unit of the pressure generating device need be connected by means of a hydraulic line to the reservoir vessel, wherein in the hydraulic line a switching valve is arranged for the optional closing or opening of the respective hydraulic line. It is however advantageous if, in order to increase the flexibility of the pressure generating device, both working chambers are connected by separate hydraulic lines to the reservoir vessel, wherein in each hydraulic line a switching valve is arranged for the optional opening or closing of the hydraulic line.

The pressure regulation can be realised in the afore-described embodiment simply by pressure regulation by means of a piston adjustment of the double-stroke piston (volume control). In addition, the pressure build-up and the pressure decrease can be specifically controlled by valve control of the switching valve arranged in the connecting line, as well as the switching valves arranged in the hydraulic lines to the reservoir vessel.

In addition, the pressure reduction can alternatively be performed simply by opening the valves of the reservoir vessel, wherein the pressure reduction is performed simply via the respective working chamber of the piston-cylinder unit. For a precise pressure regulation a pressure sensor can in addition be used, in particular for the pressure reduction from the slave cylinders of the hydraulic consumers. The valves between the working chambers (ShV) and the reservoir vessel (PD1, PD2) then as it were replace the outlet valves known from braking systems and can therefore also be termed pressure reducing valves. Since the pressure reduction is performed according to the invention via the hydraulic lines, which are monitored by means of a pressure sensor, advantageously a pressure-regulated pressure reduction via the pressure reduction valves is possible. This pressure reduction has significant advantages compared to conventional outlet valves, which are operated in a time-controlled manner, since there a switching valve is connected upstream of the respective consumer and no pressure information is available during the pressure reduction. Functionally the pressure sensors can be dispensed with for the regulation, in which the pressure is calculated via the phase current measurement of the electrical drive via the torque constant kt. By means of a temperature monitoring of the motor and calculation of the temperature of the permanent magnets of the electric motor or linear motor that drives the double-stroke piston, the change of the torque constant over temperature, which is typically <10%, the torque can be improved still further. The pressure in the linear motor can be directly calculated via the surfaces, and in the motor-gear drive the efficiency of the gear mechanism must in addition be taken into account, which especially with ball-type linear drives is very high and is subject to a slight fluctuation. The use of a pressure sensor in a hydraulic circuit is however appropriate for the adjustment of the pressure-volume characteristic curve and calibration of the pressure calculation. In addition, the fail-safe status is improved. Alternatively, redundant current measurement sensors can also be used.

If additional switching valves are employed at the outputs of the double-stroke piston, as is illustrated in FIG. 1c, then advantageously additional degrees of freedom are obtained for the pressure regulation. Also, virtually all degrees of freedom of the pressure build-up and pressure reduction, in particular individual pressure build-up and pressure reduction in each circuit, simultaneous pressure build-up and pressure reduction of both circuits, can be realised only with one pressure reduction valve. In addition, the motor can be relieved after the adjustment of the piston, in which the pressure stored in a consumer is confined by closing the switching valve.

In addition the effective area of the piston of the piston-cylinder unit between the front and rear chamber can be configured differently in such a way that the pressure volume demand for the actuation of one or more consumers is matched in such a way that with an adjustment stroke in the forward or reverse stroke direction, one consumer is completely reduced to 1 bar while the other consumer is subjected to the normal operating pressure, i.e. the volume demand for the actuation of different slave pistons of the consumers is compensated by the area ratios, so that the forward stroke and reverse stroke adjustment path is approximately the same.

In addition, the differently large effective areas of the two chambers of the double-stroke piston can be used in such a way that the pressure reduction in the system is realised over the stroke movement of the piston, without having to release volume from the chambers of the piston-cylinder unit to the storage vessel. In this way the stored energy can be completely utilised (FMS-spring-mass-oscillator principle). For the pressure regulation and the volume balance between both hydraulic circuits the connecting valve between both circuits is then primarily used. With changes of the pressure-volume characteristic curve, for example in the formation of steam, there is a change in the volume balance. In this case the asymmetry is compensated by supply from the reservoir vessel and pressure relief in the storage container. This also applies to the case when a specific time pressure course is required. In this case both pressure reduction valves are necessary.

The switching and mode of operation of differently large hydraulic surfaces, in particular for pressure regulation in the case of pressure build-up and pressure reduction, can be made possible by a connection of the front side and rear side of the double-stroke piston via one or more switching valves in the connecting line with large flow cross-sections as well as a direct connection of the front side and rear side via a short low-flow hydraulic connecting line, which in the region of the end stroke of the double-stroke piston of one chamber connects with the initial stroke of the double-stroke piston of the second chamber. The connecting length is thus approximately as large as the overall stroke of the double-stroke piston. For a low-flow design the cylinder of the piston-cylinder unit as well as the connecting line are advantageously part of a hydraulic block. The switching valves are preferably also arranged in the hydraulic block.

Apart from the switching valve in the connecting line, the at least one pressure reduction valve can also be arranged in the hydraulic block.

In addition, in the sense of optimisation (downsizing of the linear reactor) the choice of the cross-sectional areas between the front side and rear side of the double-stroke piston is crucial. A ratio of the effective areas of the front side and rear side of the double-stroke piston of 1.5 to 2.5, preferably 2, should be chosen in this connection so as to achieve an effective downsizing. With an area ratio of 2:1 (front surface A1/rear surface A3), when the connecting valve ShV between the two working chambers is opened the hydraulically active surface on the actuator can be halved both in the forward stroke and in the reverse stroke, since A1-A2 acts in the forward stroke and A2 in the reverse stroke. In this way the torque of the drive motor can be halved and the axial force on the gear mechanism is halved. This allows, apart from a reduction in the cost of the actuator, also the use of an inexpensive trapezoidal spindle drive for the conversion of the torque into a translational force.

Furthermore, an exact pressure control is functionally converted via path control of a linear actuator both during pressure build-up and also optionally during pressure reduction. For this purpose a pressure-volume (path) characteristic curve is depicted as a model via a pressure sensor and used for the control.

As an alternative to the linear actuator the double-stroke piston can also be actuated via a motor/gear mechanism solution. In this case, which is not described in more detail, a gear mechanism is arranged between the motor and double piston tie rod, which also permits a rectangular arrangement of the double-stroke piston relative the motor.

The device according to the invention means that, for example, apart from a connected coupling, one or more hydraulic consumers, such as for example chain speed selectors, can be supplied in a highly efficient manner with pressure and volume, wherein at the same time an exact regulation of the consumers is ensured. The primary applications are change speed selectors of a double coupling gear mechanism in addition to the coupling actuation.

Advantageous implementations and developments of the invention are disclosed by the features of the dependent claims.

In other words, by means of the solution according to the invention and its embodiments and developments the following functions inter alia can be realised and in summary the following advantages can be achieved:

Simultaneous pressure build-up in one hydraulic circuit and pressure reduction in another, second hydraulic circuit by using the hydraulically stored energy in a slave piston in order to meet the output performance of the double-stroke piston pressure piston unit (spring-mass principle);

Simultaneous pressure reduction and pressure build-up in each chamber of a consumer with two hydraulic chambers for the position regulation of an actuator (e.g. steering mechanism, change speed selector);

Exact pressure regulation by path control instead of pressure regulation via the pressure-volume/path relationship both in pressure build-up and also pressure reduction via the double-stroke piston;

Accurate pressure reduction control and regulation via double-stroke piston chamber and pressure reduction valve (s) using the pressure information in the hydraulic circuit;

Many degrees of freedom of the exact pressure regulation (individual pressure build-up and pressure reduction) in a circuit K1 or multiple circuits K1+K2;

Demand-oriented energy-efficient pressure generation (pressure-on-demand) and current disconnection of the drive by using switching valves to hold the stored pressure;

Supplying multiple hydraulic consumers, such as for example couplings, change speed selectors, in multiplex operation (i.e. primarily sequential or partially simultaneous pressure regulation in multiple consumers via pressure/volume control by double-stroke piston) by switching the consumers on and off by magnetic switching valves in the respective feed lines;

Very compact, inexpensive pressure volume and conveying unit by downsizing the motor/gear mechanism by reducing the power and the torque of the electric motor via two switchable hydraulic cross-sectional surfaces via a connecting valve (ShV), and thus the use of smaller motors and more inexpensive trapezoidal spindles, which are integrated in the motor;

Very high degrees of freedom in the optimisation of hydraulic systems (dispensing with complicated pressure reduction regulation methods, pressure sensors of multiple actuators, connection of multiple consumers to an electrically actuated hydraulic source).

By means of the degrees of freedom and exact pressure regulation valve switchings of consumers can be simplified, for example replacement of complicated proportional valves by simple solenoid valves. In addition, the linear drive of the piston-cylinder unit of the pressure generating device can be significantly simplified by the switchable effective surfaces and the degrees of freedom can be utilised by virtue of the fact that a plurality of consumers are connected to the pressure generating device. A redundancy can thereby be created, in which the drive motor is provided with a redundant 6-phase winding and a redundant activation is provided, and in the event of a failure of one hydraulic circuit the second hydraulic circuit can still be used.

DESCRIPTION OF THE FIGURES

Various possible embodiments of the pressure generating device according to the invention are described in more detail hereinafter with the aid of the drawings, in which:

FIG. 1a shows the basic construction of a first possible embodiment of the pressure generating device according to the invention, which can also be termed a pressure regulation and volume conveying unit, hereinafter also double-stroke piston pressure regulating unit. This has a bilaterally acting piston 1, hereinafter also called double-stroke piston DHK, which can be displaced via a pressure rod 2 with a linear drive, consisting of electric motor M and gear mechanism, which in particular is a ball-type linear gear mechanism, in both directions over the path sk. An angle transmitter 6a and phase current measurement sensor(s) 6b are provided on the actuator M. As an alternative to the angle transmitter a sensor can be used directly to determine the piston stroke position (6c). This is helpful in improving the position regulation particularly in case of slippage in the gear mechanism. The double-stroke piston 1 defines a first working space and pressure chamber 3a and a second working space and pressure chamber 3b. Both working spaces 3a, 3b are connected via non-return valves 4a and 4b to a storage container 5. The non-return valves 4a, 4b have a large opening cross-section, so that a throttling action is avoided.

Figure 1A:
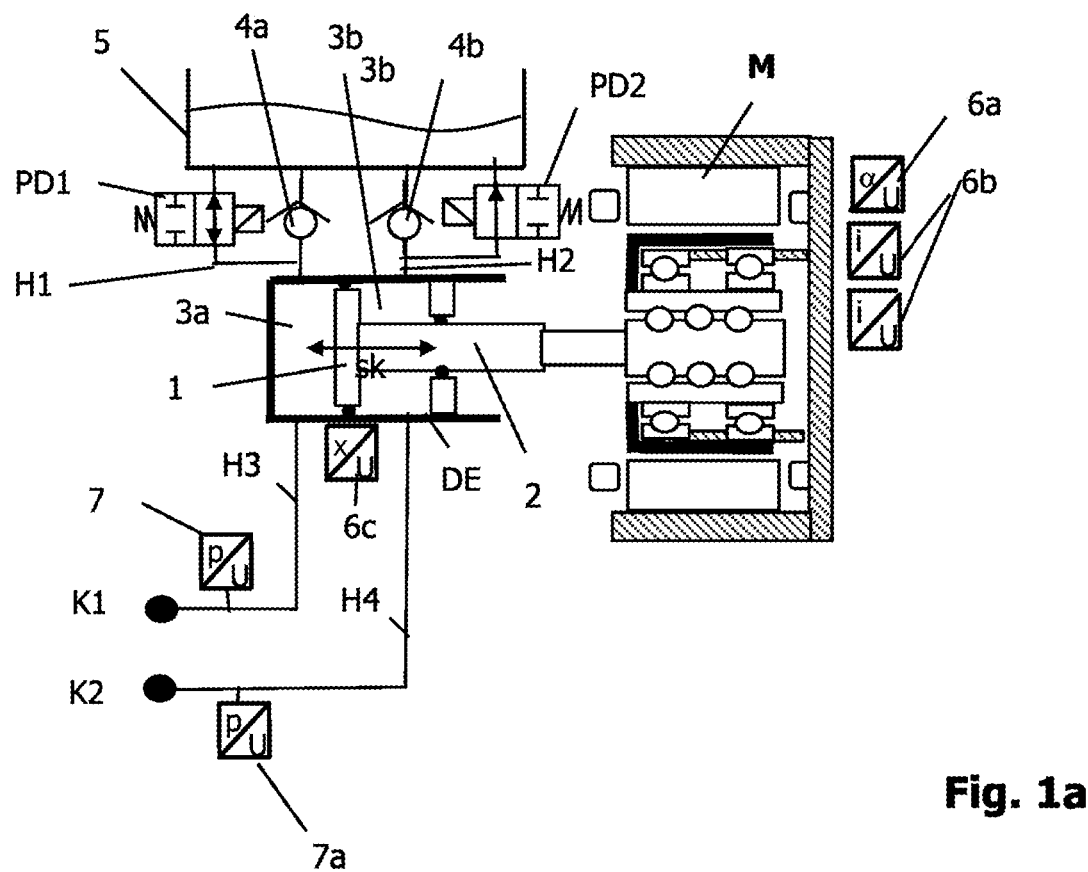
FIG. 1a: shows the basic construction of a pressure generating device with double-stroke piston, hereinafter also termed double-stroke piston pressure regulating unit, with motor gear mechanism unit for the pressure supply of two hydraulic circuits with pressure reduction valves.

The pressure generating device regulates the pressure in the two hydraulic circuits K1 and K2. Pressure sensors 7 and 7a are arranged in the feed lines H3, H4 between the working spaces 3a, 3b and the hydraulic circuits K1 and K2. The pressure sensors 7 or 7a can be dispensed with for the regulation if the torque of the motor M is calculated via the phase current measurement and the system pressure in the hydraulic line H3, H4 is calculated via the effective cross-sectional surface, in which no pressure sensor is present. However, for safety considerations and in order to calibrate the pressure volume characteristic line at least one pressure sensor is desirable. Also, the phase current measurement can be designed to be redundant so as to be able to completely dispense with the pressure sensors.

In addition, two switchable valves PD1 or PD2 are provided, which can also be termed pressure reduction valves, which are arranged in the hydraulic line H1, H2 connecting the respective working space 3a, 3b with the reservoir vessel 5. A pressure reduction from both working spaces 3a, 3b into the reservoir vessel 5 is thus possible. By opening one or both valves PD1 or PD2 the pressure can be reduced in a controlled manner during the forward or reverse stroke via path control of the path sk or stopping the double-stroke piston 1. In this connection, at least one of the two pressure sensors 7, 7a or the current measurement is used for the pressure reduction regulation. This is particularly advantageous compared to a pressure regulation via conventional outlet valves with PWM (pulse-width modulation) operation, since the pressure can be reduced in a controlled manner with a high degree of accuracy. With conventional outlet regulation with upstream connected closed switching valves (e.g. outlet valve between SV1 and consumer V1 or outlet valve between consumers V2 and SV2, see FIG. 4b) this pressure regulation accuracy is not possible, since no pressure sensor can be used for the pressure reduction regulation in such an arrangement as is normal in brake regulation systems.

Figure 1B:
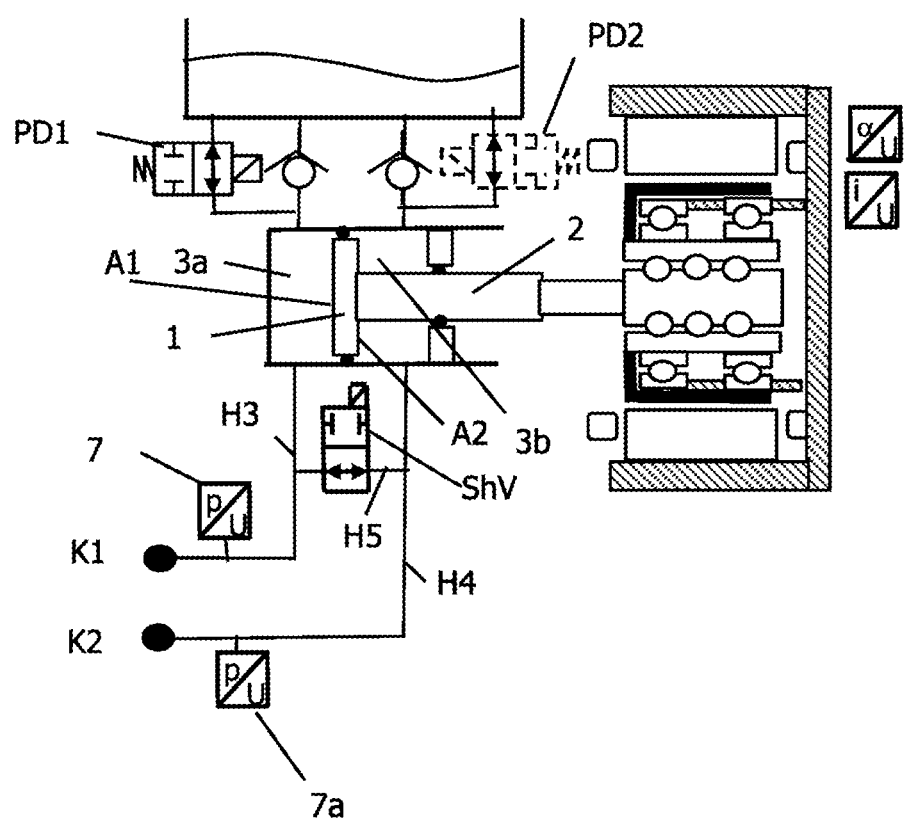
FIG. 1b: shows the basic construction of the double-stroke piston pressure regulating unit with motor gear mechanism unit for the pressure supply of two hydraulic circuits with pressure reduction valves and shifting valve.

FIG. 1b shows a further possible embodiment of the pressure generating device according to the invention, in which the working space 3a is bounded by the effective surface A1 and the second working space 3b is bounded by the effective surface A2 of the piston 1. The ratio of the surfaces A1 and A2 is approximately 2:1, but is at least 1.5:1 however and at most 2.5:1. In addition a switchable pressure compensation valve ShV is arranged between the chambers 3a, 3b. The switchable valve ShV is in the case of highly dynamic systems designed as a switching valve without a throttle function and consequently has a large flow cross-section. The connecting line containing the switching valve ShV and connecting the pressure chambers 3a, 3b and the hydraulic lines H3, H4 leading from these to the consumers, is as short as possible and begins at least at one pressure chamber as far as possible directly at the outlet of the piston-cylinder unit. In particular elements that increase the flow resistance, such as additional valves, etc., should be avoided as far as possible in this region. Alternatively, instead of a switching valve ShV multiple switching valves can also be connected in parallel in the connecting line H5. By means of such a parallel connection standard valves from large-scale mass production can be used by means of such a parallel arrangement. By switching the pressure compensation valve ShV a connection can be produced between the front side and rear side of the double-stroke piston 1 and during the piston stroke different effective surfaces can be realised by pressure compensation. With a less dynamic system or the use of fewer consumers in the system the flow cross-section of the switching valve ShV and the flow resistance of the hydraulic lines that connect the working chambers of the double-stroke piston are less relevant and the connection can also be made via multiple valves, for example in the hydraulic circuits.

Two hydraulic circuits K1 and K2 are supplied by the pressure generating device. When the valve ShV is closed the circuit 1 is supplied with pressure in the forward stroke and the circuit 2 is supplied with pressure in the reverse stroke. When the valve ShV is open, in the forward stroke and reverse stroke both the circuit K1 and K2 are jointly supplied with pressure via the effective surface A1-A2 (in the forward stroke) and A2 (in the reverse stroke). The pressure in at least one hydraulic line H3, H4 is determined by means of a pressure sensor 7, optionally also by means of the two pressure sensors 7, 7a. A pressure sensor can be dispensed with for the regulation if the torque of the motor M is calculated via the phase current measurement and the system pressure is calculated via the effective cross-sectional area.

Figure 1C:
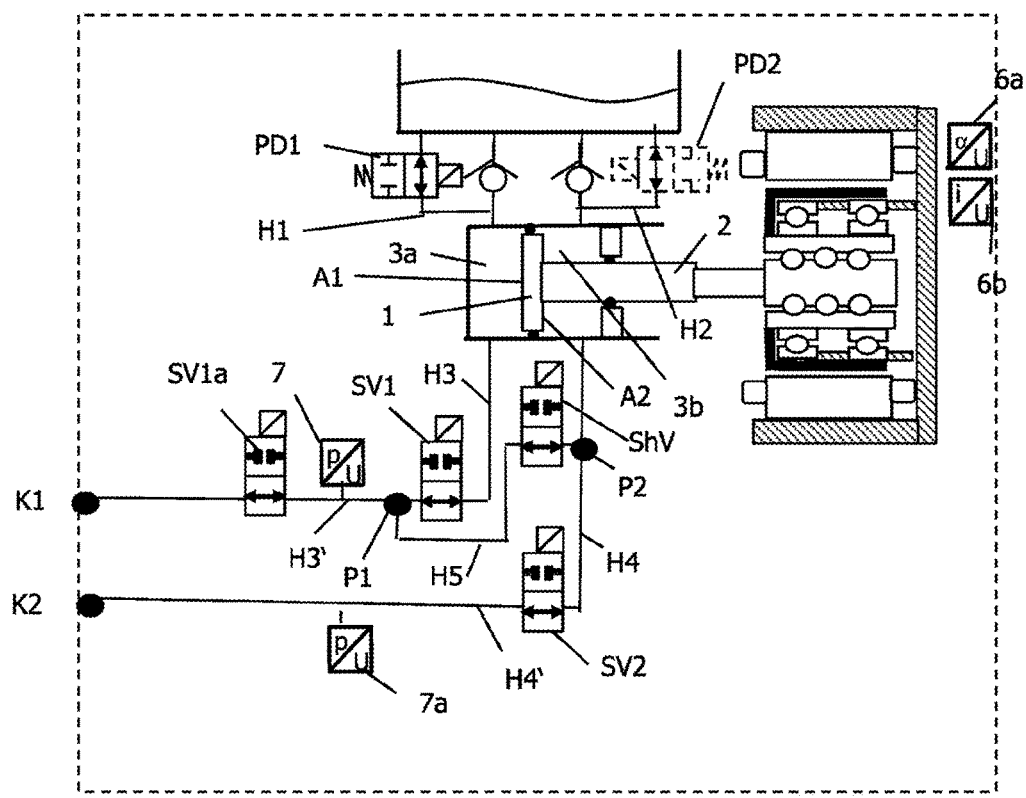
FIG. 1c: shows the basic construction of the double-stroke piston pressure regulating unit with motor gear mechanism unit for the pressure supply of two hydraulic circuits with one, alternatively two, pressure reduction valves as well as switching valves in the hydraulic circuits for further degrees of freedom in the pressure regulation.

FIG. 1c shows an expansion of the pressure generating device of FIG. 1b, in which further switching valves SV1, SV1a and SV2 are provided in the hydraulic lines H3, H4. In this arrangement the switching valves SV1 and SV2 are arranged at the outputs of the front chamber 3a and rear chamber 3b and the switching valve ShV directly connects the hydraulic circuit K1 to the chamber 3b. The switching valve SV1a is then arranged in front of the connecting line H5 and the hydraulic circuit K1.

This expansion produces a larger functional scope for the regulation of the consumers. In this connection the double-stroke piston 1 has via the stroke control, partially with the use of the pressure volume characteristic curve and the pressure sensor 7a and 7b (see the implementation in FIG. 3b) the following degrees of freedom in this embodiment:

pressure build-up individually in circuit K1 and circuit K2;
pressure build-up jointly in circuit K1 and circuit K2;
pressure reduction individually in circuit K1 and circuit K2;
pressure reduction jointly in circuit K1 and circuit K2;
simultaneous pressure build-up in circuit 1 and pressure reduction in circuit 2;
simultaneous pressure build-up in circuit 2 and pressure reduction in circuit 1.

For the implementation of these functions the valves in FIG. 1c is are switched as follows. In this connection it should be noted that the valve PD2 as well as the hydraulic line H2 can also be dispensed with for the regulations described hereinafter, since it is always operated closed in the executed functions and therefore corresponds in its function to a non-return valve.

| | Pressure build-up $P_{auf}$K1 | | Pressure build-up $P_{auf}$K2 | |
|---|---|---|---|---|
| Double-stroke piston stroke direction | Forward stroke | Reverse stroke | Forward stroke | Reverse stroke |
| ShV | 0 | 1 | With switching FIG. 1b (FIG. 4a, SV1 at consumer) ShV, SV2 open | 0 |
| SV1 | 1 | 0 | | 0 |
| SV2 | 0 | 0 | | 1 |
| PD1 | 0 | 0 | | 0 |
| PD2 | 0 | 0 | | 0 |

| | Pressure reduction $p_{ab}$K1 | | Pressure reduction $p_{ab}$K2 | |
|---|---|---|---|---|
| Double-stroke piston stroke direction | Forward stroke | Reverse stroke | Forward stroke | Reverse stroke |
| ShV | 1 | 1 | 0 | With switching 4a (SV1 at the consumer) SV2 and ShV open |
| SV1 | 0 | 1 | 0 | |
| SV2 | 0 | 0 | 1 | |
| PD1 | 1 | 0 | 1 | |
| PD2 | 0 | 0 | 0 | |

| | Pressure reduction $p_{ab}$K1 + K2 | | Pressure reduction $p_{ab}$K1 + K2 | |
|---|---|---|---|---|
| Double-stroke piston stroke direction | Forward stroke | Reverse stroke | Forward stroke | Reverse stroke |
| ShV | 1 | 1 | 1 | 1 |
| SV1 | 1 | 0 | 1 | 0 |
| SV2 | 1 | 1 | 1 | 1 |
| PD1 | 0 | 0 | 0 | 1 |
| PD2 | 0 | 0 | 0 | 0 |

Designations:
0 Valve closed
1: Valve opened

Further degrees of freedom of the simultaneously regulated pressure build-up and pressure reduction can be used if the valve PD1 and also the valve PD2 are provided and employed. In this way, in addition to the aforementioned possibilities the pressure in each case one of the two hydraulic circuits K1, K2 or also in both hydraulic circuits K1 and K2 pressure regulated via the chambers 3a, 3b of the double-stroke piston can be reduced in a controlled manner by using the pressure sensors 7 and 7a and the valves PD1, PD2.

Figure 2:
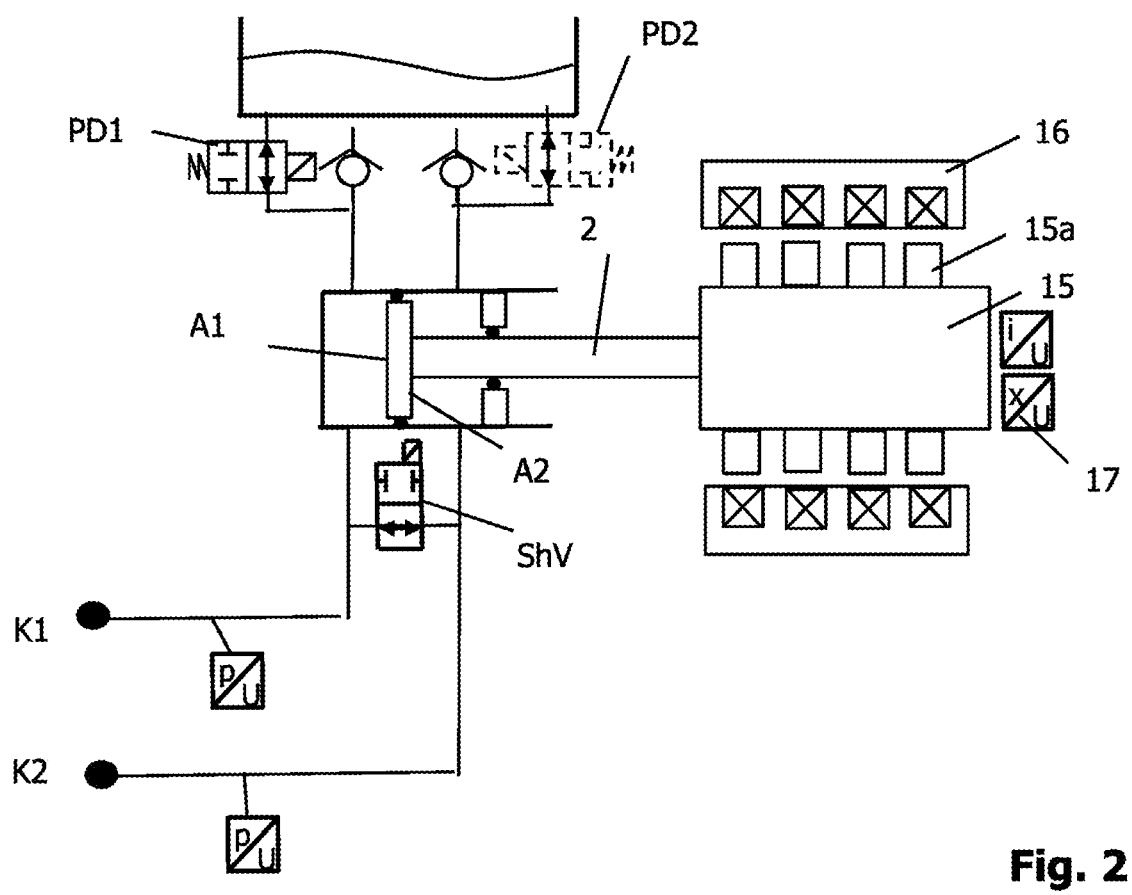
FIG. 2: shows the basic construction of the pressure generating device with a linear drive without gear mechanism.

FIG. 2 describes the same pressure generating device as in FIG. 1a, but with the difference that the pressure rod piston 2 can be actuated via a linear actuator, consisting of an armature 15 with permanent magnets 15a, a stator with excitation coils 16 and a linear path sensor 17. The function is the same as in FIG. 1a. Linear actuators have advantages compared to motor screw drives if the double-stroke piston is designed for small stokes and small forces occur in the system. Optionally the connecting valve ShV is used, which has the same mode of action as described in FIG. 1b.

Figure 3A:
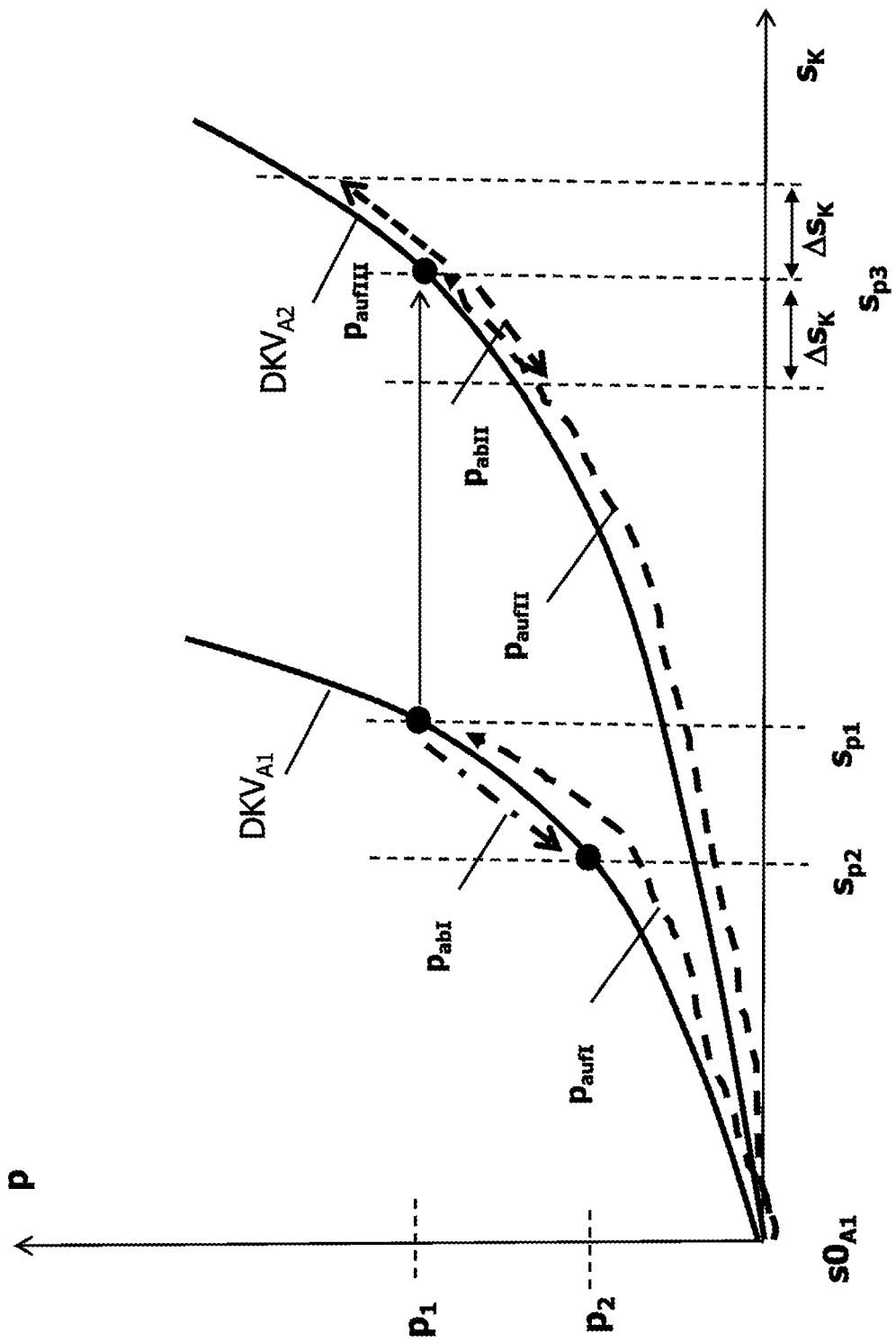
FIG. 3a: shows a pressure regulating method taking into account the switchable surfaces.

FIG. 3a describes the regulation strategy for the accurate pressure regulation via the formation of a pressure-volume (path) characteristic curve in a relationship between pressure rod path sk and pressure p. The pressure sensor 7 of FIGS. 1a, 1b, 1c is used to produce the pressure-volume characteristic curve. The pressure-volume characteristic curve can be compensated in operation.

This method is used in particular in the pressure build-up and pressure reduction of coupling actuators and further consumers, such as for example change speed selectors, if no simultaneous pressure build-up and pressure reduction is necessary, i.e. either a coupling or a change speed selector is operated in sequence.

A ratio of the chamber areas of the double-stroke piston of approximately A1/A2=2 is used as the basis in the representation. The pressure build-up begins starting from an initial pressure $sO_{A1}$. A desired regulating pressure p1 is adjusted by modulating the linear actuator during the pressure build-up $p_{auf}$I with area A1, for example in the forward stroke up to the position $S_{p1}$, and during the pressure build-up $p_{auf}$II with area A2, for example in the reverse stroke up to the position Sp3. The pressure-path characteristic curve forms the basis for the regulation, and illustrates the non-linear connection between pressure and path. Also pressures lower than p1 can also be adjusted via the pressure-path characteristic curve. On switching to the effective surface A2 the pressure-volume characteristic curve is displaced, and a new reference path $S_{p3}$ is formed. Pressure changes can be adjusted by adjusting difference paths Dsk. The path-controlled pressure regulating strategy has the advantage that the pressure can be adjusted significantly more effectively if the regulation is performed by stroke and not by using the pressure sensor, since in this way pressure fluctuations and elasticities of the pressure line cannot influence the regulation as interference quantities and no stringent demands need be placed in the accuracy of pressure sensors.

If the pressure regulation unit according to FIG. 1b is used, i.e. with pressure reduction valve PD1, the pressure can be regulated via the path control sk also in the pressure reduction via the pressure-path relationship ($p_{abI}$). For this purpose the piston 1 is operated in reverse stroke. In this connection it must be ensured that the volume in the second chamber 3b is not compressed, i.e. can escape via PD2 into the reservoir vessel. A comparable pressure reduction ($P_{abII}$) can also be regulated in the forward stroke with a smaller effective surface. For this, the volume is released via the reservoir vessel PD2 into the reservoir vessel. An equivalent effect is achieved in the pressure reduction method $P_{abII}$) if the ShV valve is opened in the reverse stroke. In this case no PD1 or PD2 valve is required for the pressure reduction. The displaced volume is conveyed from the rear chamber 3b into the front chamber of the double-stroke piston.

Figure 3B:
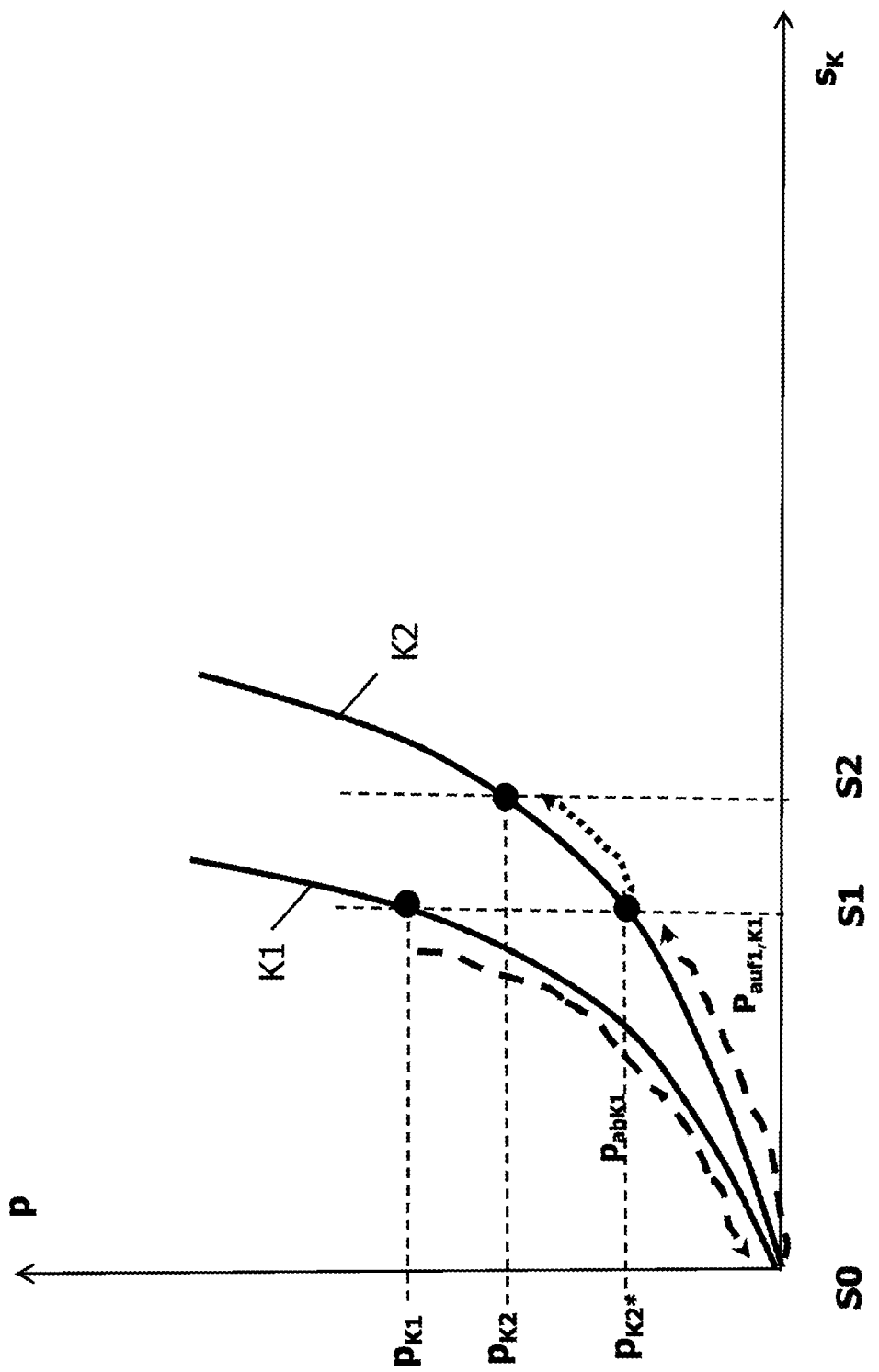
FIG. 3b: shows the pressure regulating method in the coupling actuation with different consumers and hydraulic effective cross-sectional surfaces.
Figure 5:
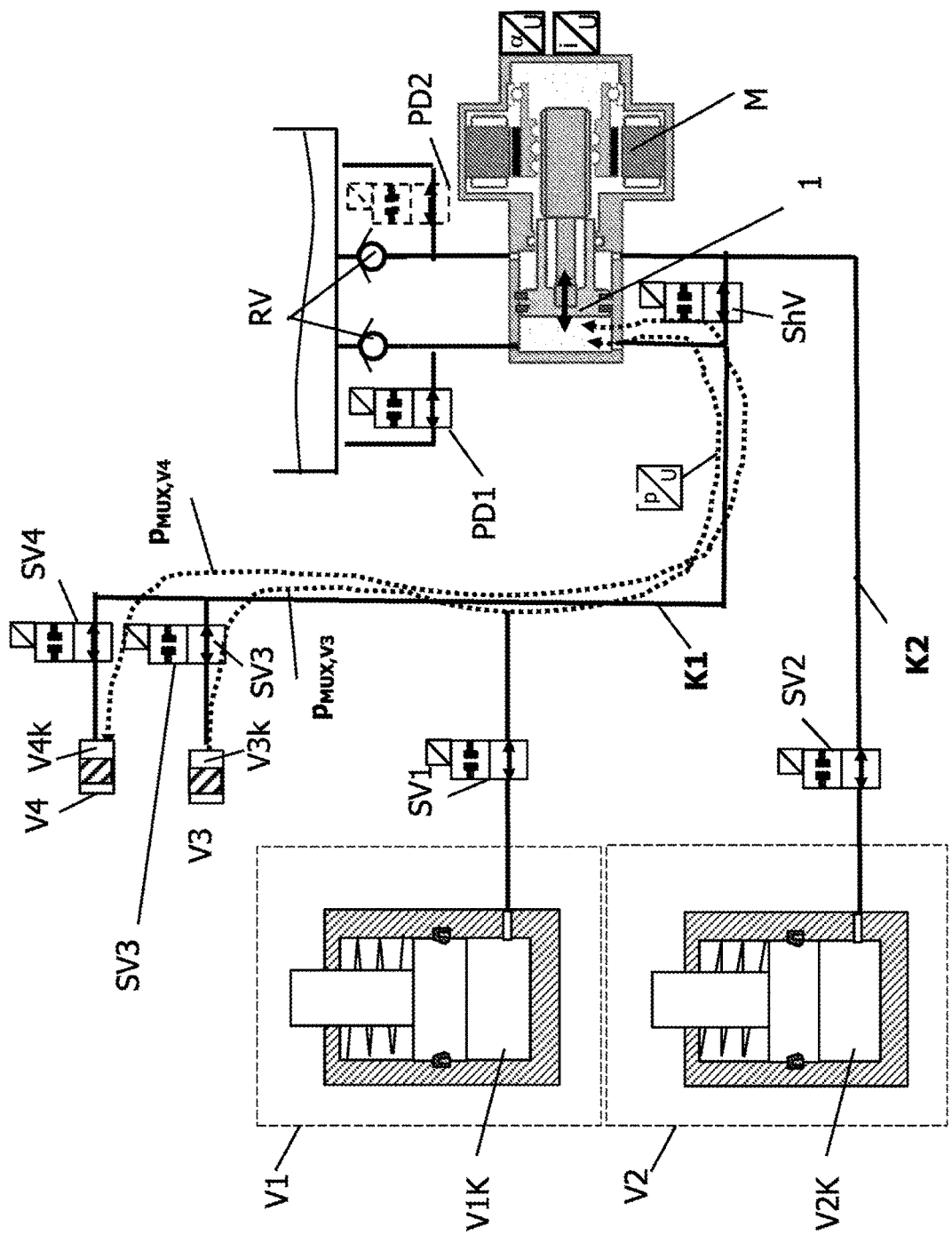
FIG. 5: shows the use of the pressure generating device as a piston actuator as well as switching actuator for more than two consumers (in particular two couplings and two switching actuators with pressure regulation of the coupling and of the switching actuators in the multiplex method)

FIG. 3b describes the regulation process with simultaneous pressure build-up and pressure reduction via both chambers of the double-stroke piston (for example with the actuation of two couplings in the system construction according to FIG. 5). There slightly different pressure-volume characteristic curves of two slave cylinders are used as a basis or alternative identical pressure-volume characteristic curves of the slave pistons and a double-stroke piston design with a surface ratio of the hydraulic surfaces A1/A2=S2/S1.

For this purpose, starting from the position S1 the piston is adjusted in the reverse stroke from the position S1 to the position S2. The pressure of the coupling K1 is reduced from the operating pressure $P_{K1}$ to approximately zero, while at the same time the pressure in the coupling K2 is increased from approximately zero to $p_{K2}$. The actuator is then moved further to the position S2 until the operating pressure pK2 is reached. In the reverse stroke movement the missing volume is conveyed from the storage chamber via the non-return valves to the front chamber of the double-stroke piston, in order to avoid a negative pressure. Compared to a sequential method this method has the significant advantage that one coupling K1 can be released very quickly, while the coupling K2 is applied at the same time.

This is achieved in particular for a switching process with minimum time delay, which is required with a double coupling system. In addition, the pressure in one coupling can be used as energy source, so that only a drive motor with a minimum power demand is necessary, and the dynamics of the switching process compared to a two-actuator system with the same motor can be significantly improved in the switching process, since the stored hydraulic energy can be utilised in the switching process.

By using a ShV valve and corresponding actuation the control can in addition be optimised, for example in that the procedure for releasing a coupling K1 is synchronised with the application procedure of the second coupling, i.e. the procedure is terminated with an adjustment path in the middle between S1 and S2 (i.e. S=0.5×(S1+S2)).

In particular in the reverse procedure (i.e. coupling K2 is released from the operating pressure pK2 by an adjustment path S2), the use of the AV valve is desirable, otherwise the operating pressure pK1 of the coupling K1 is exceeded. A remedy is also the use of discharge valves (PD1 or PD2) or further outlet valves in the system. Here the PD1 valve is important, since the pressure reduction in the coupling K1 can be accurately controlled via the discharge valve PD1 using the pressure sensor in K1, even without using a ShV valve. PD1 and ShV are therefore alternatives and both are not absolutely necessary. The PD2 valve has a similar importance when the surface ratio A1/A2 is approximately equal and the coupling actuator K2 has a larger volume.

As an alternative to the pressure supply unit, also the double-stroke piston pressure supply unit with a valve switching as illustrated in FIG. 2 can be used.

Figure 4:
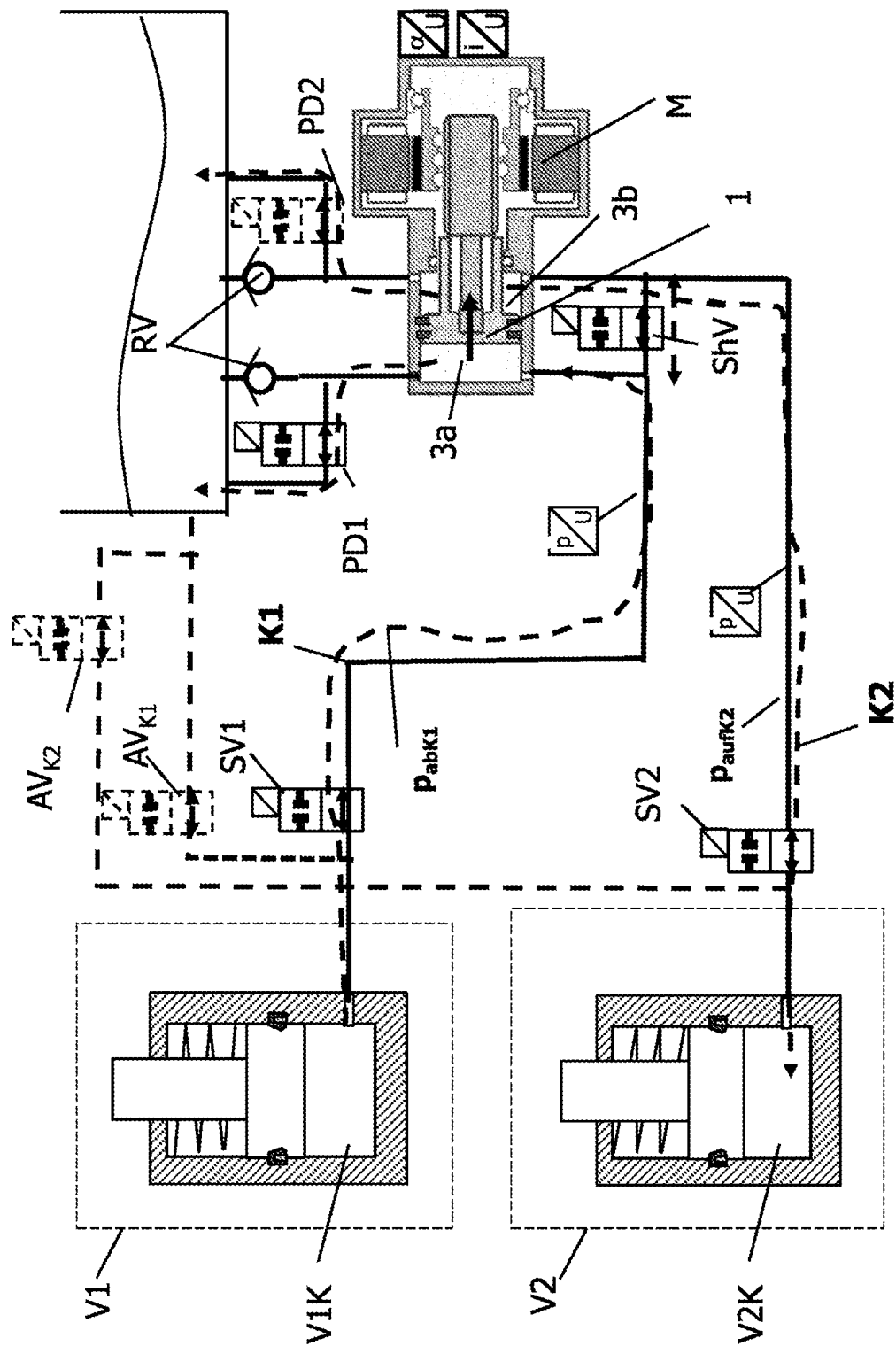
FIG. 4: shows the use of the pressure generating device as a piston actuator for two hydraulic consumers (in particular couplings) with additional use of a ShV valve and switching valves at the consumers for multiplex operation.

FIG. 4 represents an embodiment of the pressure generating device according to the implementation in FIG. 1b, in which the potential of the double-stroke piston 1 is used. The pressure generating device can also be used in the configuration according to FIG. 1c, in which the switching valves SV1 and SV2 are part of the pressure supply unit (SV1a=SV1, SV2=SV2). Each working space 3a, 3b is connected to a slave cylinder V1K, V2K of the two couplings V1 and V2. This system arrangement allows the pressure reduction of the coupling K1 ($p_{red,K1}$) via the front chamber 3a of the double-stroke piston while at the same time the pressure build-up in the coupling K2 ($p_{aufK2}$) is carried out via adjustment in the reverse stroke direction of the double-stroke piston. The simultaneous pressure build-up and pressure reduction can also take place in the forward stroke direction. In this case the pressure in the consumer B2 is reduced and the pressure in the consumer B1 is increased by the forward stroke movement of the double-stroke piston. To assist this, both PD1 and PD2 can be used for the pressure reduction regulation. The ShV valve can likewise be opened for the pressure reduction and also for the pressure build-up regulation, and the pressure varying over the movement of the double-stroke piston can be influenced, in which the circuits K1 and K2 are connected.

Thanks to the provision of outlet valves, in a system introduction the advantage of an exact pressure build-up regulation via piston path control as well as the simultaneous pressure change possibility (pressure reduction in chamber V1k, pressure build-up in chamber V2K) via the mode of operation of the double-stroke piston can be used in a first step, especially in the actuation of two couplings that have to be switched simultaneously.

In addition, the valve ShV with an area ratio A1/A2 of approximately 2:1 can be used with the same volume management of the couplings V1 and V2 for the downsizing of the torque of the drive motor. In this way, starting from a specific operating pressure (ca. 50% of the operating pressure) in the forward stroke the hydraulically effective surface can be halved and is then approximately twice as large as in the reverse stroke.

The currentless open switching valves SV1 and SV2 mean that when the target pressure of the coupling is reached by flow of current they are closed and the pressure in the slave piston hydraulics is maintained with a low valve current. In this way the power load of the motor M and the performance requirement can be reduced and the regulation can be facilitated, in particular when the target pressure is reached the consumer can be disconnected and in a sequential step the other consumer can be adjusted to the target pressure value via the pressure volume control.

As an alternative to the pressure supply unit the pressure generating device can also be used with a valve switching as illustrated in FIG. 2. The valve switching of FIG. 2 can also be adapted comparably as in FIG. 1b to FIG. 1c. The same applies to the following system descriptions in FIGS. 5 and 6.

FIG. 5 shows an expansion of the system described in FIG. 4 for the additional actuation of multiple consumers V3, V4 with the simultaneous omission of a pressure sensor in the circuit K2. Alternatively, a pressure sensor in the circuit K2 is also possible and the pressure sensor is dispensed with in the circuit K1. For this, switching vales SV1, SV2, SV3, SV4 are provided for each consumer V1-V4. The change speed selectors are controlled in the so-called multiplex method, i.e. by actuating hydraulic consumers VS3 or VS4 the currentless open switching valves of the coupling actuators are closed, so that the pressure is maintained by current flowing through the solenoid valves and the pressure is not raised by the actuation. The pressure of the slave piston of the consumer V3 or V4 is, as already described, increased or reduced ($p_{MUX,V3}$, $p_{MUX,V4}$) via the double-stroke piston having regard to the pressure-volume characteristic curve. When the pressure is reached the switching valve SV3 or SV4 is closed, and in a following sequence a further consumer can be actuated. This method is as a rule performed sequentially especially when change speed selectors are used, since no simultaneous actuation of change speed selector is carried out and in a double coupling gear mechanism and moreover the change speed selection procedure does not take place at the same time as the coupling actuation procedure. The method however offers the possibility of the simultaneous or partially simultaneous pressure build-up and pressure reduction, as is known from the multiplex operation of the inventor.

Due to the expansion of the coupling actuation system to further consumers the system can be significantly simplified compared to conventional double coupling systems, in which a drive mechanism is provided for each change speed selector and each coupling. Since switching valves are comparatively favourable and light also with a low flow resistance, significant cost savings and weight reduction can thereby be achieved.

Figure 6:
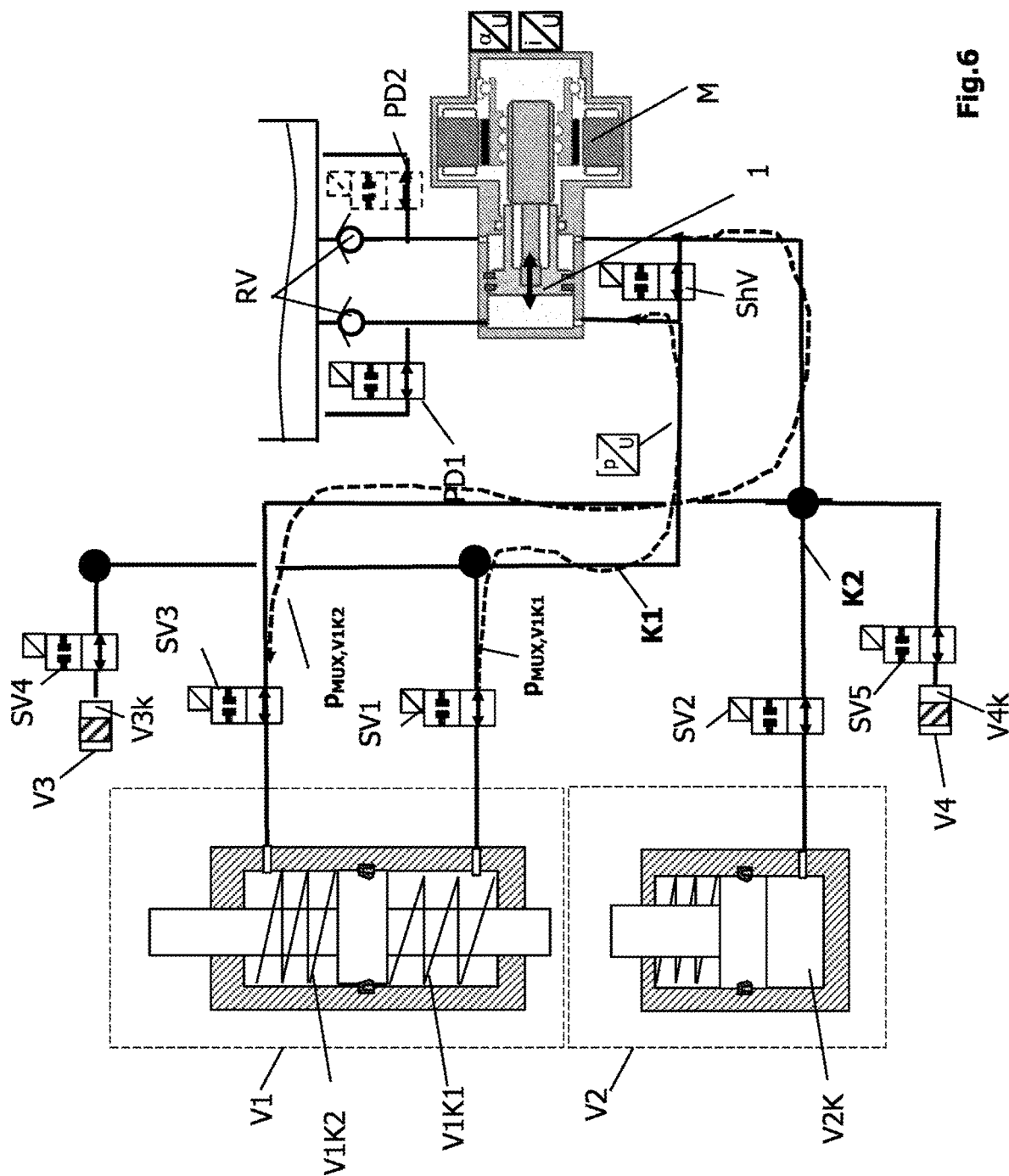
FIG. 6: shows the use of the pressure regulating unit as coupling actuator and switching actuator for consumers with two hydraulic effective surfaces (e.g. change speed selector, steering mechanism) as well as optionally further consumers with multiplex operations.

FIG. 6 shows an alternative to FIG. 5, in which in the multiplex operation two chambers V1K1 and V1K2 of a consumer V1 as well as a second consumer V2 are charged with pressure with the pressure generating device according to the invention. In contrast to FIG. 5 the piston of the consumer V1 can be adjusted in both directions, wherein with the adjustment of the rod in V1 both hydraulic circuits K1 and K2 are used, in which in one chamber of the double-stroke piston the pressure is reduced and, by displacing the piston, in another chamber the pressure is increased. The valves PD1, PD2 or ShV are additionally used for the regulation, wherein only at most two valves are necessary for the regulation. An outlet valve $AV_{K3}$ can also be connected between a hydraulic chamber of a consumer, here for example illustrated for the consumer V3, and the respective switching valve SV3, via which the pressure can be dissipated from the chamber V3$k$ via a separate hydraulic line H8 directly to the reservoir vessel 5.

In this implementation the pressure is supplied in the chamber V1K2 or V1K2 and the piston is adjusted very accurately with the pressure regulating method according to the invention. In the application the consumers can for example represent a steering mechanism or change speed selector (V1) as well as a coupling (V2).

Further consumers V3, V4 with upstream connected switching valves SV4 and SV5 with the operating principle of the consumers V1 and/or V2 can be connected to the hydraulic circuits K1 and K2 and operated in multiplex operations. Thus, for example, a complete double coupling gear mechanism (with 2 couplings, 4 change speed selectors) or a plurality of couplings as well as a steering mechanism can be operated with a pressure supply unit and other hydraulic systems with a central actuator can be supplied with pressure (e.g. electrohydraulic valve operation).

LIST OF REFERENCE NUMERALS

1 Bilaterally acting piston or double-stroke piston
2 Pressure rod piston
3$a$ Chamber
4$a$ Non-return valve
4$b$ Non-return valve
5 Reservoir vessel
6$a$ Non-return valve
6$b$ Non-return valve
7 Pressure sensor
8 Ball-type linear drive
9$a$ Bearing
9$b$ Bearing
10 Rotor
11 Stator
12 Excitation coils
13 Housing
14 Transducer
15 Armature
15$a$ Permanent magnets
16 Stator with excitation coils
17 Linear path sensor
20 Pressure regulating unit
21$a$ Pressure build-up valve
21$a$ Pressure release valve
22$a$ Pressure build-up valve
22$b$ Pressure release valve
23 Line
24 Line
32$a$ Line
32$b$ Line
33$a$ Solenoid valve
33$b$ Solenoid valve
34 Control piston cylinder unit
35 Pressure chamber
36 Seal
37 Pressure piston
38 Spring
39 Active piston
40 Control piston cylinder unit
41 Pressure chamber
42 Pressure chamber
43 Control piston
44 Seal
45 Sniffing hole seal
46 Reservoir vessel
47 Pressure sensor
48 Path simulator
49 Pedal unit
50 Hydraulic circuit
51 Hydraulic circuit
52 Pressure sensor
53 Pressure sensor
54 Path sensor
55 Electric control and regulating unit (ECU)
AV Switchable pressure compensation valve
D1 Seal
D2 Seal
K1 Hydraulic circuit
K2 Hydraulic circuit
SiV Safety valve
Sk Path
TV Isolation valve
V1 Consumer
V2 Consumer
V3 Consumer and coupling actuation
V4 Consumer and brake system

What is claimed is:

1. A pressure generating device comprising:
a piston-cylinder unit, which comprises a bilaterally acting piston that separates two working spaces in the cylinder of the piston-cylinder unit from one another in a sealing manner, wherein the piston has two surfaces, and wherein each surface of the piston respectively defines a respective one of the two working spaces,
respective first hydraulic lines connecting each of the respective working spaces to a respective hydraulic circuit, there thus being two respective hydraulic circuits corresponding to the two respective working spaces, wherein at least one hydraulic chamber of a respective hydraulic consumer is connected to a respective one of the two hydraulic circuits, and
a drive configured to drive the piston of the piston-cylinder unit, wherein each working space is in communication by means of a respective second hydraulic line with a reservoir vessel for a hydraulic medium, wherein in each respective second hydraulic line connecting a respective working space with the reservoir vessel, at least one switching valve is arranged for the optional closure or opening of the respective second hydraulic line, wherein the pressure generating device further comprises at least one pressure sensor configured to measure a pressure in at least one of the first hydraulic lines, wherein pressure reduction in at least one of the hydraulic consumers is carried out by opening at least one switching valve, wherein with the respectively opened switching valve, the hydraulic medium for the pressure reduction in one or more of the hydraulic consumers is enabled to be released or to flow out, via at least one of the respective working spaces, into the reservoir vessel, wherein a control device uses, for regulation, pressure calculated by one or more pressure sensors in one or both hydraulic circuits and/or calculated from a phase current sensor.

2. The pressure generating device according to claim 1, wherein the drive of the piston-cylinder unit includes a linear motor or a rotation motor and gear mechanism.

3. The pressure generating device according to claim 1, wherein only a front one of the working spaces, defined by one of the effective surfaces of the piston that is a leading surface of the piston when the piston is moved in a forward stroke, is configured to be connected via a valve to the reservoir vessel, or wherein both working spaces are configured to be connected via valves to the reservoir vessel.

4. The pressure generating device according to claim 1, wherein areas of the effective surfaces are in a ratio of 1.5:1 to 2.5:1 to one another.

5. The pressure generating device according to claim 1, wherein the working spaces and/or the hydraulic lines connecting the working spaces to the hydraulic circuits, or the hydraulic circuits, are connected to one another via a connecting line, wherein at least one switching valve is arranged in the connecting line for optional opening or closure of the connecting line.

6. The pressure generating device according to claim 5, wherein the at least one switching valve has a flow cross-section sufficiently large to avoid a throttling function.

7. The pressure generating device according to claim 5, wherein the connecting line and a first one of the hydraulic lines connecting a respective working space of the piston-cylinder unit to a respective brake circuit meet at a point (P1), wherein a switching valve is arranged in a section of the first one of the hydraulic lines that connects the point P1 and the working space, and wherein the connecting line and the second one of the hydraulic lines connecting a respective working space of the piston-cylinder unit to a respective brake circuit meet at a point (P2), wherein a further switching valve is arranged in a section of the second one of the hydraulic lines leading from the point P2 to the at least one hydraulic consumer.

8. The pressure generating device according to claim 1, wherein both working spaces are connected to the reservoir vessel, wherein the connection is formed via non-return valves with a closing direction from the respective working spaces of the pressure generating device to the reservoir vessel or via switching valves.

9. The pressure generating device according to claim 1, further comprising a pressure sensor that is used only in one of the hydraulic circuits, and wherein a pressure of a respective one of the surfaces of the piston defining a respective one of the working spaces is calculated via a phase current of the drive measured with one of more current sensors and a torque calculated based on a torque constant, taking into account a switching state of connecting valve, and a transmission efficiency, and used for pressure regulation.

10. The pressure generating device according to claim 1, wherein no pressure sensor is used in either one of the hydraulic circuits, and wherein a pressure of a respective one of the surfaces of the piston defining a respective one of the working spaces is calculated via a phase current of the drive measured with redundant current sensors and a torque calculated based on a torque constant, taking into account a switching state of s connecting valve, and a transmission efficiency, and used for pressure regulation.

11. The pressure generating device according to claim 1, further comprising a respective switching valve associated with a respective hydraulically acting working chamber of the one or more hydraulic consumers for optional closure or opening of a respective hydraulic line to the pressure generating device.

12. The pressure generating device according to claim 1, wherein pressure build-up and pressure reduction are carried out by means of path control of the bilaterally acting piston.

13. The pressure generating device according to claim 12, wherein the path control of the double-stroke piston is carried out by means of an angular position of a rotation motor of the drive, or stroke position of a linear motor of the drive, or a position of the bilaterally acting piston.

14. The pressure generating device according to claim 1, wherein pressure build-up and pressure reduction in one or both hydraulic lines connecting the working spaces of the piston-cylinder unit to the hydraulic circuits is enabled to be altered by opening and closing the switching valve in the connecting line.

15. The pressure generating device according to claim 14, wherein, with a simultaneous pressure reduction in a first one of the two hydraulic circuits and pressure build-up in the second one of the two hydraulic circuits, the control device is configured to use the pressure calculated by the one or more pressure sensors in one or both of the hydraulic circuits and/or calculated from the phase current sensor.

16. The pressure generating device according to claim 1, wherein, by means of adjustment of the piston, pressure is increased or reduced in at least one hydraulic consumer and is reduced in at least one other hydraulic consumer.

17. The pressure generating device according to claim 1, wherein pressure supply of at least two hydraulic consumers in multiplex operation (MUX), is effected by disconnecting the hydraulic consumers by means of associated valves.

18. The pressure generating device according to claim 1, wherein the pressure generating device is configured to supply at least two hydraulic consumers with pressure, wherein one hydraulic consumer is a vehicle clutch, a chamber of a change speed selector or a gear mechanism.

19. The pressure generating device according to claim 1, wherein the pressure generating device is configured to supply at least one hydraulic chamber with pressure, wherein two hydraulic consumers comprise, in each respective case, a chamber of a hydraulic consumer for actuating a bilaterally acting piston configured to actuate a steering rod.

20. The pressure generating device according to claim 1, wherein the pressure generating device is configured to supply at least two hydraulic consumers with pressure, wherein one hydraulic consumer comprises a valve hydraulic chamber in a cylinder head of an internal combustion engine and is configured to actuate one or two gas exchange valves.

21. The pressure generating device according to claim 1, further comprising one or more respective outlet valves associated with one or more respective hydraulic chambers of the hydraulic consumers and arranged to enable direct pressure reduction from one or more of the respective hydraulic chambers into the reservoir vessel.

22. A method of optional pressure build-up and pressure reduction in at least two hydraulic chambers of one or more hydraulic consumers, by means of a pressure generating device, which comprises a piston-cylinder unit that has a bilaterally acting piston, which separates two working spaces in the cylinder from one another in a sealing manner, wherein the piston has two surfaces, wherein each surface of the piston defines a respective working space, thereby defining two working spaces, wherein each of the two working spaces is connected via a respective hydraulic line to a respective one of two hydraulic circuits, wherein at least one hydraulic chamber of the at least one hydraulic consumer is connected to a respective one of the two hydraulic circuits, and wherein a drive is configured to drive the piston of the piston-cylinder unit, the method comprising:
regulating pressure build-up in the hydraulic chambers via a path control of the piston based on a pressure-volume characteristic curve, and
carrying out pressure reduction in at least one of the hydraulic chambers connected to a first one of the two hydraulic circuits via piston path control of the pressure generating device in a forward stroke or reverse stroke of the piston via a first of the two working spaces of the piston-cylinder unit, and at least temporarily at the same time, supplying with pressure, by a second one of the two working spaces of the piston-cylinder unit of the pressure supply unit, a further hydraulic chamber connected to a second one of the two hydraulic circuits.

23. The method according to claim 22, wherein the carrying out pressure reduction is performed via a switching valve and/or by adjustment of the piston, wherein in the case of pressure reduction via the switching valve, a pressure determined by a pressure sensor or determined in a circuit from a phase current of the drive is used in control of the switching valve.

24. The method according to claim 22, wherein the carrying out pressure reduction is performed via an outlet valve and/or by adjustment of the piston by path control using the pressure-volume characteristic curve, wherein in the case of pressure reduction via the outlet valve, a pressure determined by a pressure sensor or determined in a respective one of the hydraulic circuits from a phase current of the drive is used in controlling the outlet valve, and a hydraulic connection between the pressure generating device or a working space of the piston-cylinder unit of the pressure generating unit and outlet valve is produced by opening an intermediately connected switching valve.

25. The method according to claim 24, wherein the regulating pressure build-up comprises path control using the pressure-volume characteristic curve of the piston-cylinder unit, wherein in the forward stroke and reverse stroke of the piston, the pressure build-up and pressure reduction are carried out in respective hydraulic consumers, wherein a respective one of the switching valves is opened for pressure change in a respective hydraulic consumer.

26. The method according to claim 25, at least one valve is opened in switching between the forward stroke and reverse stroke of the piston or switching of the effective surfaces of the piston in the pressure build-up at high pressures in order to realise an effective surface in the forward stroke.

27. The method according to claim 26, wherein switching from the larger effective surface of the bilaterally acting piston to the smaller effective surface comprises opening the at least one valve in a proximity to a maximum operating pressure in the forward stroke operation, wherein in the at least one valve actuation, a surface ratio of the two effective surfaces lies in a range from 1.5 to 2.5 and a resultant reduction of the effective surface, as well as a maximum torque of the drive, are taken into account.

28. The method according to claim 26, wherein the at least one valve is opened, in switching between the forward stroke and reverse stroke of the piston and the switching of the effective surfaces, and in the pressure reduction, regulating volume management of the pressure supply unit and/or regulating a basic pressure reduction gradient by the effective surface as well as by a piston adjustment speed.

29. The method according to claim 25, wherein the regulating pressure reduction is carried out by path control using the pressure-volume characteristic curve of the piston-cylinder unit, and wherein in the forward stroke and reverse stroke of the piston, the pressure build-up and pressure reduction are carried out in the respective hydraulic consumer, wherein the respective switching valve is opened for the pressure change in the respective hydraulic consumer.

30. The method according to claim 22, wherein a stored energy as well as a volume of the consumer in one or more of the hydraulic consumers is used to assist the drive as well as a volume balance of the piston-cylinder unit.

31. The method according to claim 22, wherein pressure build-up/pressure reduction is regulated by path control of the piston-cylinder unit based on the pressure-volume characteristic curve, and is used at least temporarily up to the end of a complete switching procedure of two hydraulic chambers switching valves, along with pressure information, for pressure regulation.

32. The method according to claim 22, wherein the path control of the bilaterally acting piston is carried out by means of an angular position of a rotation motor of the drive or a stroke position of a linear motor of the drive or of the bilaterally acting piston.

33. The method according to claim 22, wherein pressure regulation of the bilaterally acting piston is carried out by changing the switchable effective surfaces of the bilaterally acting piston in both stroke directions of the bilaterally acting piston, and by using pressure information obtained via pressure sensor/pressure calculation via phase current measurement for the pressure regulation by at least switching a connecting valve between the working spaces.

34. The method according to claim 22, further comprising using a pressure sensor in only one of the hydraulic circuits; and calculating a pressure, to thereby obtain a calculated pressure, via a phase current of the drive measured with one or more current sensors and/or a torque calculated from a torque constant, of a respectively acting hydraulic surface of the working spaces having regard to a switching state of a connecting valve between the working spaces and via a gear mechanism efficiency, wherein the calculated pressure is used for the pressure regulation.

35. The method according to claim 22, wherein no pressure sensor is used, and wherein a calculated pressure of a respectively effective hydraulic surface of the working spaces is calculated via a phase current of the drive measured with redundant current sensors and via a torque calculated using a torque constant, having regard to a switching state of a connecting valve between the working spaces, and also via a transmission efficiency, and wherein the calculated pressure is used for the pressure regulation.

36. A pressure generating device comprising:
- a piston-cylinder unit that comprises a bilaterally acting piston that separates two working spaces in the cylinder of the piston-cylinder unit from one another in a sealing manner, wherein the piston has two surfaces, and wherein each effective surface of the piston defines a respective one of the two working spaces;
- respective first hydraulic lines connecting each of the respective working spaces to a respective hydraulic circuit, there thus being two respective hydraulic circuits corresponding to the two respective working spaces, wherein at least one hydraulic chamber of a respective hydraulic consumer is connected to a respective one of the two hydraulic circuits; and
- a drive configured to drive the piston of the piston-cylinder unit,
- wherein each of the two working spaces is in communication, by means of a respective second hydraulic line, with a reservoir vessel for hydraulic medium, wherein, in each respective second hydraulic line connecting a respective working space with the reservoir vessel, at least one switching valve is arranged for the optional closure or opening of the respective second hydraulic line,
- wherein the pressure generating device further comprises at least one pressure sensor configured to measure a pressure in at least one of the first hydraulic lines,
- wherein pressure reduction in at least one of the hydraulic consumers is performed by means of adjustment of the piston and/or by opening at least one switching valve, wherein, with the switching valve opened, the hydraulic medium for pressure reduction in at least one of the hydraulic consumers is enabled to be released or to flow out via at least one of the respective working spaces or directly, via an outlet valve, into the reservoir vessel, and
- wherein the pressure generating device is capable of either reducing pressure in the two hydraulic circuits simultaneously via the working spaces or of building up pressure in a first one of the two hydraulic circuits while simultaneously reducing pressure in a second one of the two hydraulic circuits.

* * * * *